United States Patent [19]

Riccio et al.

[11] Patent Number: 4,883,703

[45] Date of Patent: Nov. 28, 1989

[54] METHOD OF ADHERING THERMAL SPRAY TO SUBSTRATE AND PRODUCT FORMED THEREBY

[76] Inventors: Louis M. Riccio, P.O. Box 81, DeVault, Pa. 19432; Alexander A. Bosna, 135 Summit Rd., Malvern, Pa. 19355

[21] Appl. No.: 237,125

[22] Filed: Aug. 29, 1988

[51] Int. Cl.[4] .......................... B32B 3/30; B32B 5/18; B05D 1/08; B05D 1/36

[52] U.S. Cl. .................................... 428/142; 427/404; 427/405; 427/407.3; 427/408; 427/409; 427/410; 427/422; 427/423; 427/203; 427/204; 428/148; 428/149; 428/313.9; 428/319.1; 428/325

[58] Field of Search ..................... 427/404, 407.3, 203, 427/204, 408, 409, 410, 405, 422, 423; 428/142, 145, 148, 149, 313.9, 319.1, 325

[56] References Cited

U.S. PATENT DOCUMENTS

| | | | |
|---|---|---|---|
| 682,173 | 9/1901 | Coleman | 428/551 |
| 3,325,303 | 6/1967 | Lant et al. | 427/203 |
| 4,521,475 | 6/1985 | Bosna et al. | 428/142 |
| 4,618,504 | 10/1986 | Bosna et al. | 427/34 |
| 4,751,113 | 6/1988 | Riccio et al. | 427/404 |

*Primary Examiner*—Evan Lawrence
*Attorney, Agent, or Firm*—Jim Zegeer

[57] ABSTRACT

In a process for thermally spraying molten metal onto an uncured resin, to prevent some of the sprayed metal particles from being engulfed in the still wet or uncured resin layer, the resin layer is filled with micron sized beads, filler and/or spheres. The spheres or beads or other filling of the resin prevents the impacting metal particles from being engulfed but still allows the metal particles to imbed in the uncured resin surface to achieve a strong mechanical bond when the resin cures.

2 Claims, 1 Drawing Sheet

(PATENT No. 4,751,113)

METHOD OF ADHERING THERMAL SPRAY TO SUBSTRATE AND PRODUCT FORMED THEREBY

BACKGROUND OF THE INVENTION

In our Patent No. 4,751,113 we disclosed a method of applying a coating of metal on a substrate surface by the application of a sealing and adhesion layer followed by a coating of thermally sprayed metal particles which are sprayed in a molten state on the uncured resin adhesion and sealing layer while it is "wet" or tacky and prior to hardening to form undercuts and roughness in the adhesion and sealing layer and then spraying one or more further metal layers of molten metal particles upon the first metal layers after curing of the adhesion and sealing layer. Spraying the molten metal particles causes them to shape and lock themselves to the embedded first layer by being forced into the undercuts and roughnesses of that layer due to the impact velocity of the molten particles forming the further metal layer. In our Patent Nos. 4,618,504 and 4,521,475, we disclosed the use of micron sized hollow glass or ceramic spheres or foaming agents for making micron-sized hollow spaces or voids which are incorporated in the resin. The resin layer with the micron-sized hollow glass or ceramic spheres or foaming agents forming voids was cured and then abraded or grit blasted so as to rupture the outermost layer of sphere voids and provide a plurality of undercuts or nooks or crannies into which the thermally sprayed metal becomes molded and imbedded such that the bond or adherent strength is greatly increased.

SUMMARY OF THE INVENTION

According to the present invention, the resin layer is applied to the substrate and initially, the resin layer may either be filled with the micron sized spheres or spaces or the micron sized spheres or spaces or beads may be sprayed upon the uncured resin to fill the same. Fillers can also be any one or a combination of the following (inorganic) kaolin, talc, calcium carbonate and barytes, alumina tryhydrate, hydrophobic amorphous fumed silica, diatomaceous earth, wollastonite and mica. Metal powders or flakes can be used for special applications as well as foaming agents. In any case, instead of curing the resin and fracturing micron sized spheres or beads as in our Patent Nos. 4,521,475 and 4,681,504, the micron-sized spheres are not fractured but serve as a filler. The thermal spray which is deposited into the still uncured resin layer impinges on the micron sized sphere or bead filled resin so that more metal particles stay at or near the surface and are not totally engulfed by the still wet or uncured resin thereby achieving the same bond or lock on the metal layers to the resin with substantially all of the sprayed metal concentrated in the surface and interlocking rather than some of the early spray particles being engulfed in the uncured or wet resin. In this case, it is not necessary that the beads or spheres be hollow since the objective is that they serve merely as fillers. Hence, the beads or spheres can be solid or hollow and, they need not be round nor inorganic, but may be metal spheres or beads if desired. Fillers can also be any one or a combination of the following (inorganic) kaolin, talc, calcium carbynate and barytes, alumina tryhydrate, hydrophobic amorphous fumed silica, diatomaceous earth, wollastonite, mica. Metal powders or flakes can be used for special applications as well as foaming agents.

BRIEF DESCRIPTION OF THE DRAWINGS

The above and other obvious advantages and features of the invention will be more apparent when considered with the following specification and accompanying drawings wherein.

DETAILED DESCRIPTION OF THE INVENTION

Figure 1:
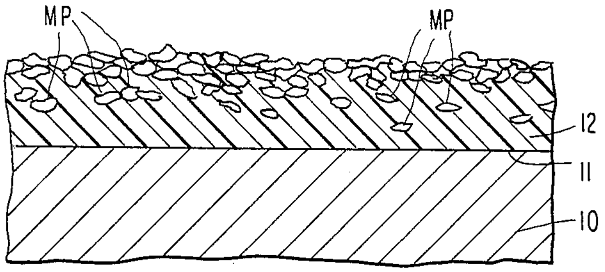
FIG. 1 is a sectional view of a coated article made in accordance with applicants' above mentiond Patent No. 4,751,113 showing how some of the particles have become totally engulfed by the uncured resin.

Referring to FIG. 1, a substrate 10 of any size shape or configuration has an exposed surface 11 upon which it is desired to apply a metal coating such as an antifouling copper metal based alloy coating. The product shown in FIG. 1 is made according to the process disclosed in our Patent No. 4,751,113 wherein the surface 11 is coated with a resin adhesion and sealing layer which is uniformly applied over the prepared surface by brush spray, squeegee, silk screen, or roller and the resin can be formulated by the addition of inhibitors and accelerators to remain slightly tacky for a predetermined period of time. In our Patent No. 4,751,113, the tacky consistency of the sealed layer permitted the imbedment of metal particles without the surface being roughened so much as to distort or alter the hydrodynamic characteristic of the surface. For example, the epoxy coating was 1 to 3 mils thick and was applied by brush and allowed to cure for about ½ to ¾ hours before the spraying of the copper coating. The resin had its cure time adjusted by the addition of accelerator or inhibitors. Moreover, various epoxy and resin combination can be cured by UV (ultraviolet) energy or by heat and it is contemplated that these type resins and epoxys can be utilized in the practice of the present invention.

At any rate, in the teachings or our Patent No. 4,751,113, the thermal spray was directed into the adhesion and sealing layer to imbed the thermally sprayed metal and it was done in two steps. The first metal layer was thermally sprayed in a molten state to be imbedded in the adhesion and sealing layer while it was still tacky and prior to hardening of same and so thereby forming undercuts and roughness in the adhesion and seal layer. Thereafter, the resin and seal layer was cured or at least partially hardened and then a further metal layer, constituted by a continuous layer of thermally sprayed metal particles, was sprayed in a molten state upon the first metal layer, and these molten particles of the further layer shaped themselves to lock to the embedded first layer by being forced into the undercuts and roughness of the surface formed by the first metal layer due to the impact velocity of the molten particles forming the layer. However, as indicated in FIG. 1, some of the metal particles became totally engulfed in the resin layer and do not form part of the desired metal coating or surfacing which would be exposed to either water to enhance the antifouling properties or whatever the function might be of the metal coating.

Figure 2:
FIG. 2 is a block diagram illustrating the process depths according to the present invention and, FIG. 3 is a sectional view of a product incorporating the invention and produced by the process illustrated in FIG. 2.

In order to avoid and/or reduce the number of particles which become engulfed or surrounded by the resin, according to the present invention, the resin while it is still in an uncured or wet state has immersed therein a filling of micron sized spheres or beads 22, or other filling material, such as fibers, "cabosil", etc. The micron sized spheres or beads can be added or mixed with the resin prior to its application to the substrate or, as indicated in FIG. 2, after the resin layer has been applied to the substrate the resin can be sprayed or dusted with micron-sized spheres or beads in the manner disclosed in our Patent No. 4,714,623.

Figure 3:
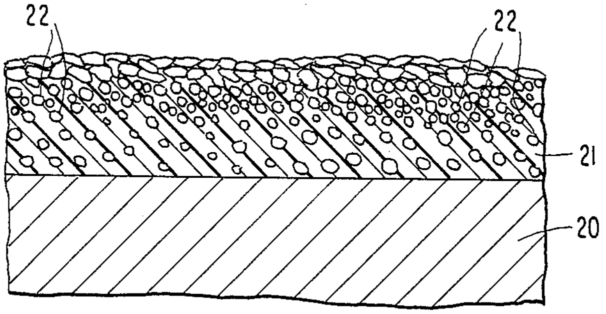

Thereafter, and while the resin layer is still in a wet or uncured state, a thermal spray of molten metal particles is applied to the resin filled with the micron-sized spheres or beads, which by the way have a variety of sizes as disclosed in our above referenced Patent Nos. 4,521,475, 4,618,504 and 4,714,623. In this case, the beads or spheres are not ruptured or fractured and may be solid. They fill the uncured resin and serve to prevent the impacting molten metal particles from penetrating deeply in the surface and cause the individual particles to shape themselves more at the surface and form better interlocks at the surface of the resin filled with the micron-sized spheres, beads or other filler agents discussed above. Since they are unruptured, and in a still uncured or wet resin, they can be displaced by the impacting metal particles to provide better or enhanced locking sites. It should be noted that in this process, the micron-sized beads or spheres are not fractured and serve as a filler. When the molten metal particles impinge on the uncured resin filled with the micron sized spheres, fillers or beads more metal particles stay at or near the surface and are not engulfed by the wet uncured resin as is indicated by FIG. 3. Thereafter, the resin can be cured by anyone of a number of process including merely letting it cure on its own curing cycle, it being understood that the heat supplied by the molten metal particles can enhance the curing process. In some cases, a uv curable resin can be cured by the use of uv (ultraviolet) and/or infrared lamp (or combination thereof) can be used to provide heat for the cure.

It will be appreciated that further metal layers can be applied after the initial layer, whether or not the resin has cured. In other words, prior to curing of the resin further metal layers can be applied since the initial metal particles are prevented from being engulfed in the resin which is filled with the micron-sized spheres, fillers or beads. Alternatively, the additional layers can be applied after curing of the resin. The use of the filling of the resin with the hollow or solid micron-sized beads, fillers or spheres results in a more uniform thickness of the metal coating as well as a more uniform consistency in the layer of resin. The micron-sized balloons or spheres 22 are of the type disclosed in our above referenced Patent Nos. 4,521,475 and 4,618,504 which are incorporated herein by reference.

While we have shown and described a preferred embodiment of the invention, it will be understood that this disclosure is for the purpose of illustration and various omissions and changes may be added thereto without departing from the spirit and scope of the invention as set forth in the claims appended hereto.

What is claimed is:

1. A method of applying a coating to a substrate surface comprising:

forming a curable resin filled with micron-sized beads or spheres or other filler on the surface of said substrate and, prior to curing of said resin;

thermally spraying metal particles in a molten state upon the exposed surface of said micron-sized sphere or bead or other filler filled resin so as to cause the molten particles to shape themselves around the upper ones of said micron-sized spheres or beads and into the surface of the uncured resin to form undercuts or roughness in the resin layer;

thermally spraying metal particles in a molten state upon that surface to a desired thickness of said metal; and curing the resin.

2. A metal coated surface made according to the method defined in claim 1.

* * * * *